United States Patent [19]

Fujisige

[11] Patent Number: 4,667,224

[45] Date of Patent: May 19, 1987

[54] WHITE BALANCE CORRECTING DEVICE

[75] Inventor: Akihito Fujisige, Tokushima, Japan

[73] Assignee: Matsushita Electric Industrial Co., Ltd., Kadoma, Japan

[21] Appl. No.: 737,028

[22] Filed: May 21, 1985

[30] Foreign Application Priority Data

May 21, 1984 [JP] Japan .................................. 59-102174

[51] Int. Cl.⁴ .............................................. H04N 9/73
[52] U.S. Cl. ..................................................... 358/29
[58] Field of Search ................................ 358/29, 29 C

[56] References Cited

U.S. PATENT DOCUMENTS 4,219,841 8/1980 Nishimura ......................... 358/29 C
4,395,730 7/1983 Shen ................................... 358/29 C
4,562,459 12/1985 Sokei ..................................... 358/29

Primary Examiner—Michael A. Masinick
Attorney, Agent, or Firm—Wenderoth, Lind & Ponack

[57] ABSTRACT

A white balance correcting device which is constructed to reduce at a time of high luminance input the low frequency luminance signal component included in either an input low frequency luminance signal or in a color difference signal of a gain-control matrix circuit which is generating the color difference signal upon receiving a color signal and low luminance signal, so as to thereby produce a precise color balance of a video picture at the time of a high luminance input.

2 Claims, 4 Drawing Figures

WHITE BALANCE CORRECTING DEVICE

BACKGROUND OF THE INVENTION

1. Field of the Invention

The present invention relates to a white balance correcting device for use in a color video camera, and more particularly, to a device which obtains a video color balance with good precision when high luminance signals are inputted thereto.

2. Description of the Prior Art

First, a conventional white balance correcting device of a color video camera will be explained with reference to FIG. 1 showing a circuit block diagram thereof. In FIG. 1, an image output signal from an image pickup tube or a solid-state image element is supplied to a color separation circuit 4 through a pre-amplifier 1 and an AGC circuit 2 and a band-pass filter 3. The image output signal is divided by the separation circuit 4 into two color signals, i.e., an R signal and a B signal, which are supplied to an R gain-control matrix circuit 7 and a B gain-control matrix circuit 9. Also, a part of the output of the AGC circuit 2, i.e., only the low frequency component of the luminance signal thereof, is fed to the R gain-control matrix circuit 7 and B gain-control matrix circuit 9 through an iris gamma correction circuit 5 and a low-pass filter 6. In addition, a part of the output of the iris gamma correction circuit 5 is fed to a composite video signal framing circuit 13 through a low-pass filter 10. Then, an (R-Y) signal which is an output from the R gain-control matrix circuit 7 is supplied to an inverting input terminal of an operational amplifier 16 after being changed to a DC voltage by a smoothing circuit 14. On the other hand, a voltage to be referred to as a standard value in a reference image condition is supplied to a non-inverting input terminal of the operational amplifier 16. The output of the amplifier 16 is fed back to the R gain-control matrix circuit 7. Also, a (B-Y) signal which is output from the B gain-control matrix circuit 9 is supplied to an inverting input terminal of the operational amplifier 17 after being changed to a DC voltage by a smoothing circuit 15, and a reference voltage 27 in a reference image condition is supplied to a non-inverting input terminal of the operational amplifier 17. The output of the operational amplifier 17 is fed back to the B gain-control matrix circuit 9.

Assuming that a color temperature in a surrounding state becomes higher than that in the reference image condition, the voltage at the inverting input terminal of the operational amplifier 16 is lowered due to a reduction of the R component of the (R-Y) signal, resulting in the output voltage of the operational amplifier 16 becoming higher. The variation of this output voltage is fed back to the R gain-control matrix circuit 7 to control the R gain-control matrix circuit 7 so as to make the R component of the (R-Y) signal larger. On the other hand, since the B component of (B-Y) signal becomes larger when the color temperature becomes higher, the voltage at the inverting input terminal of the operational amplifier 17 becomes higher so as to make th output voltage of the operational amplifier 17 become lower. The variation of this output voltage is fed back to the B gain-control matrix circuit 9 to control the B gain-control matrix circuit so as to make the B component of the (B-Y) signal smaller.

However, with the above arrangement, if the luminance signal level becomes higher than a given level in the case of taking a picture at a condition of luminance which is higher than the reference signal, both the R signal component and the B signal component begin to be smaller with respect to the luminance signal level so as to reduce both the R component and B component of the (R-Y) signal and the (B-Y) signal, resulting in the output voltages of both the operational amplifiers 16 and 17 to become higher. The variations of these output voltages are fed back to both the R gain-control matrix circuit 7 and the B gain-control matrix circuit 9 to control both the R gain-control matrix circuit 7 and the B gain-control matrix circuit 9 so as to respectively make both the R signal component and the B signal component larger. Therefore, the conventional device has a disadvantage in that, within a modulator 8, and a semicircular filter circuit 18 and a composite video signal framing circuit 13, the range of values among R, G, and B components become abnormal so as to cause the whole picture to be changed to an image having a large amount of red.

SUMMARY OF THE INVENTION

Accordingly, the present invention has an object to provide a white balance correcting device for use in a color video camera, which can eliminate the disadvantages inherent in conventional devices. In the white balance correcting device embodiments of the present invention, two kinds of color signals are obtained from an image output signal of an imaging means such as a camera tube in a color video camera or a solid-state image element and are respectively supplied to gain-control matrix circuits together with respective low luminance signal components so as to obtain respective color difference signals which are smoothed and converted to DC voltages; each DC voltage is compared with a constant voltage used as a reference so as to obtain a comparison signal, which is fed back to the respective gain-control circuit. When a light input which is inputted into the camera tube has a light level which is larger than that of a predetermined references level, either the low frequency luminance component $Y_L$ which is inputted into the gain-control matrix circuit is reduced, or the low frequency luminance component $Y_L$ which is an output from the gain-control matrix circuit is reduced, both the (R-$Y_L$) signal of the color difference signal and the $Y_L$ component of the (B-$Y_L$) signal are reduced so as to make the level variation of the (B-$Y_L$) signal small and to enable the R, G, and B components to be disposed within a normal range, so as to thereby form a picture having a white balance even at a high luminance.

BRIEF DESCRIPTION OF THE DRAWINGS

This and other objects and features of the present invention will become readily understood from the following description taken in conjunction with preferred embodiments thereof with reference to the accompanying drawings, in which.

DESCRIPTION OF THE PREFERRED EMBODIMENTS

Figure 1:
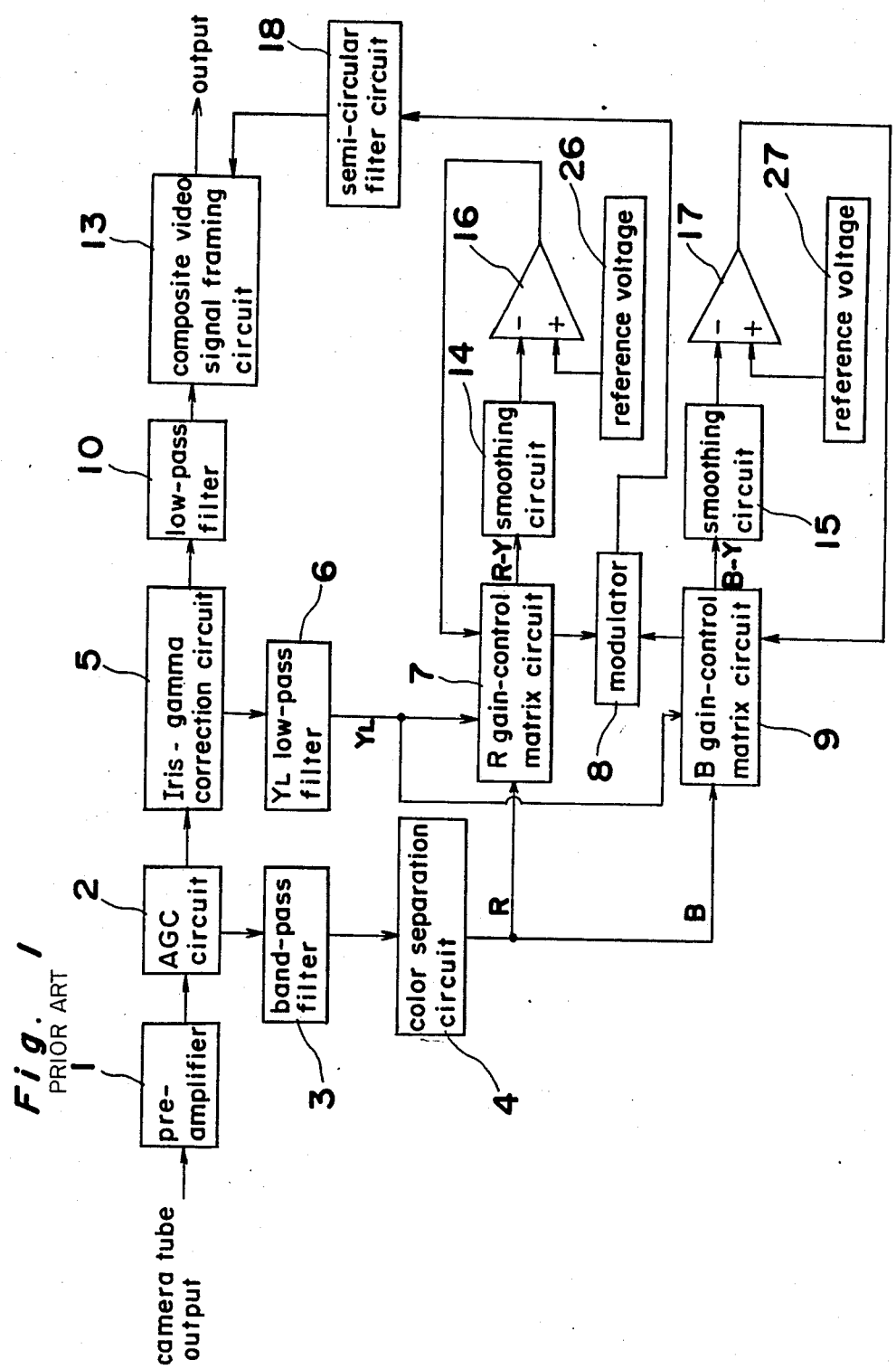
FIG. 1 is an electrical block diagram showing a white balance device of the conventional type (already referred to)

Before the description of the present invention proceeds, it is to be noted that like parts are designated by like reference numerals throughout several views of the accompanying drawings.

Figure 2:
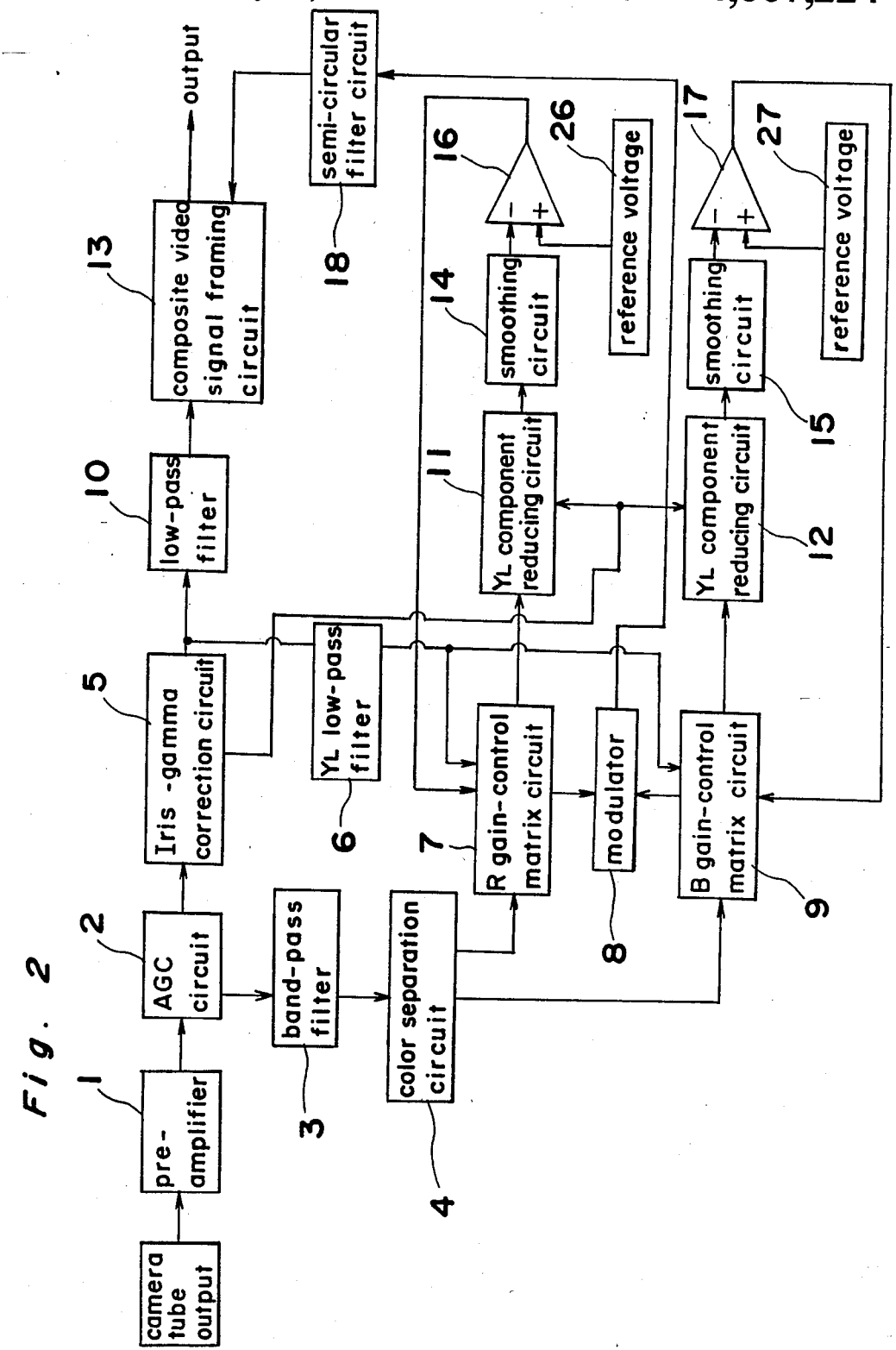
FIG. 2 is an electrical block diagram of a white balance device for use in a color video camera in accordance with one embodiment of the present invention.

FIG. 2 is a block diagram showing a white balance correcting device in accordance with one preferred embodiment of the present invention, wherein the same components as those in FIG. 1 are designated by like reference numerals and wherein descriptions thereof have been omitted for the sake of brevity. A difference between the embodiment of FIG. 2 and the conventional device of FIG. 1 is that between the gain-control matrix circuits 7 and 9 and the smoothing circuits 14 and 15, reducing circuits 11 and 12 are respectively provided for reducing the low frequency luminance signals of the color difference signal components which are output from the gain-control matrix circuits 7 and 9, at the time that the low frequency luminance signal components reach a level which is higher than a predetermined level.

Figure 3:
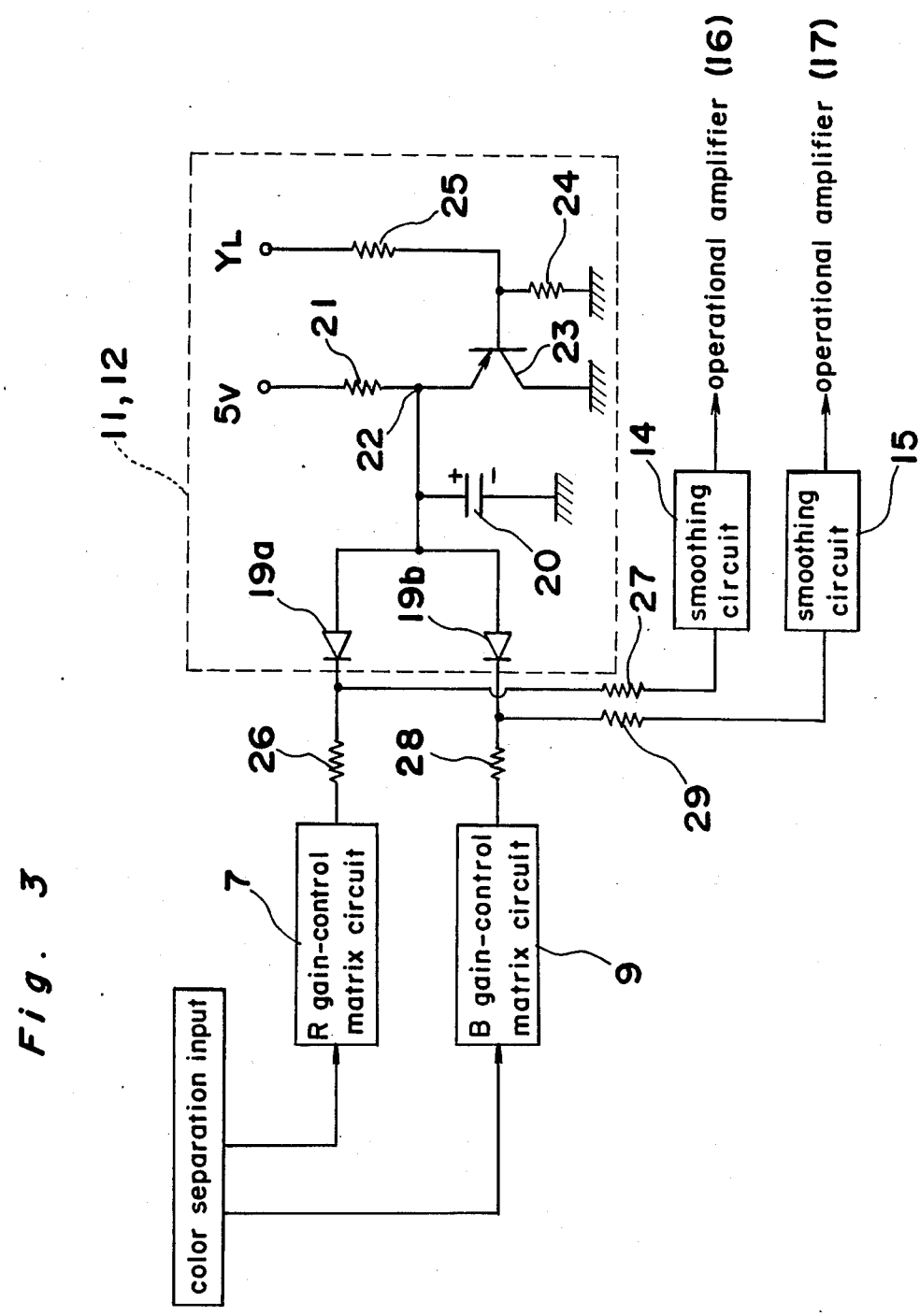
FIG. 3 is an electrical circuit diagram showing a main portion of the diagram of FIG. 2.

FIG. 3 is an electrical circuit diagram showing a concrete construction of the reducing circuits 11 and 12 employed in FIG. 2, wherein a transistor 23 has its emitter supplied with a voltage of 5 V from an electrical power source through a resistor 21, and is supplied with a signal $Y_L$ at its base through a resistor 25. A resistor 24 is connected between the base of the transistor 23 and ground, and its collector is also connected to ground. The emitter of the transistor 23 is connected to a connecting point between resistors 26 and 27 inserted in series between the gain-control matrix circuit 7 and the smoothing circuit 14 through a diode 19a, and also to a connecting point between resistors 28 and 29 inserted in series between the gain-control matrix circuit 9 and the smoothing circuit 15 through a diode 19b.

In the state of the ambient color temperature being in the reference image condition, the respective voltage levels of the (R-$Y_L$) output and the (B-$Y_L$) output, which are outputs from the R gain-control matrix circuit 7 and the B gain-control matrix circuit 9, respectively, become higher than that of the sum of the voltages between the emitter voltage of the transistor 23 and the voltages disposed between the anodes and cathodes of the diodes 19a and 19b such that the diodes 19a and 19b are cut off so that both the (R-$Y_L$) and (B-$Y_L$) outputs are input to the smoothing circuits 14 and 15 without being corrected.

However, if the light input to the camera tube becomes higher than that in the reference image condition, the base voltage of the transistor 23 is increased due to the $Y_L$ signal becoming larger, and the emitter voltage thereof also becomes higher. With respect to the (R-$Y_L$) output, the diodes 19a and 19b are brought into conduction by the increase in the emitter voltage of the transistor 23 due to a portion of the low frequency luminance component $Y_L$ of the color difference signal, and a portion of the $Y_L$ component of the color difference signal becomes a signal made by gamma correction is input to the smoothing circuits 14 and 15, respectively, resulting in a divergence of the balance of the color difference signal is rendered small at a time of the inputting of the high luminance level.

Now referring back to FIG. 2, in the reference image condition, the input signals to the smoothing circuit 14 and 15 become (R-$Y_L$) and (B-$Y_L$) signals, respectively, and are transformed into DC voltages within the smoothing circuits 14 and 15 and are fed to the inverting input terminals of the operational amplifiers 16 and 17. On the other hand, a standard voltage for the reference image condition is fed to the non-inverting input terminals of the operational amplifiers 16 and 17, and the outputs of the operational amplifiers 16 and 17 are fed back to the R gain-control matrix circuit 7 and B gain-control matrix circuit 9, respectively.

If the light input to the camera tube becomes higher than the input of the reference image condition, the luminance signal level increased, but both the R signal component and the B signal component become relatively smaller in comparison with the luminance signal level. Accordingly, the $Y_L$ signal which is a low frequency luminance component in the (R-$Y_L$) component and the (R-$Y_L$) component becomes larger, but, in the embodiment of the present invention, the variation of the color difference signal is rendered small at the time of the inputting of the high luminance level component by providing the $Y_L$ component reduced circuits 11 and 12 between the gain-control matrix circuits 7 and 9 and smoothing circuits 14 and 15, respectively, whereby the automatic white balance correcting device can always be operated in the state of reducing misoperations thereof during the high luminance input.

Figure 4:
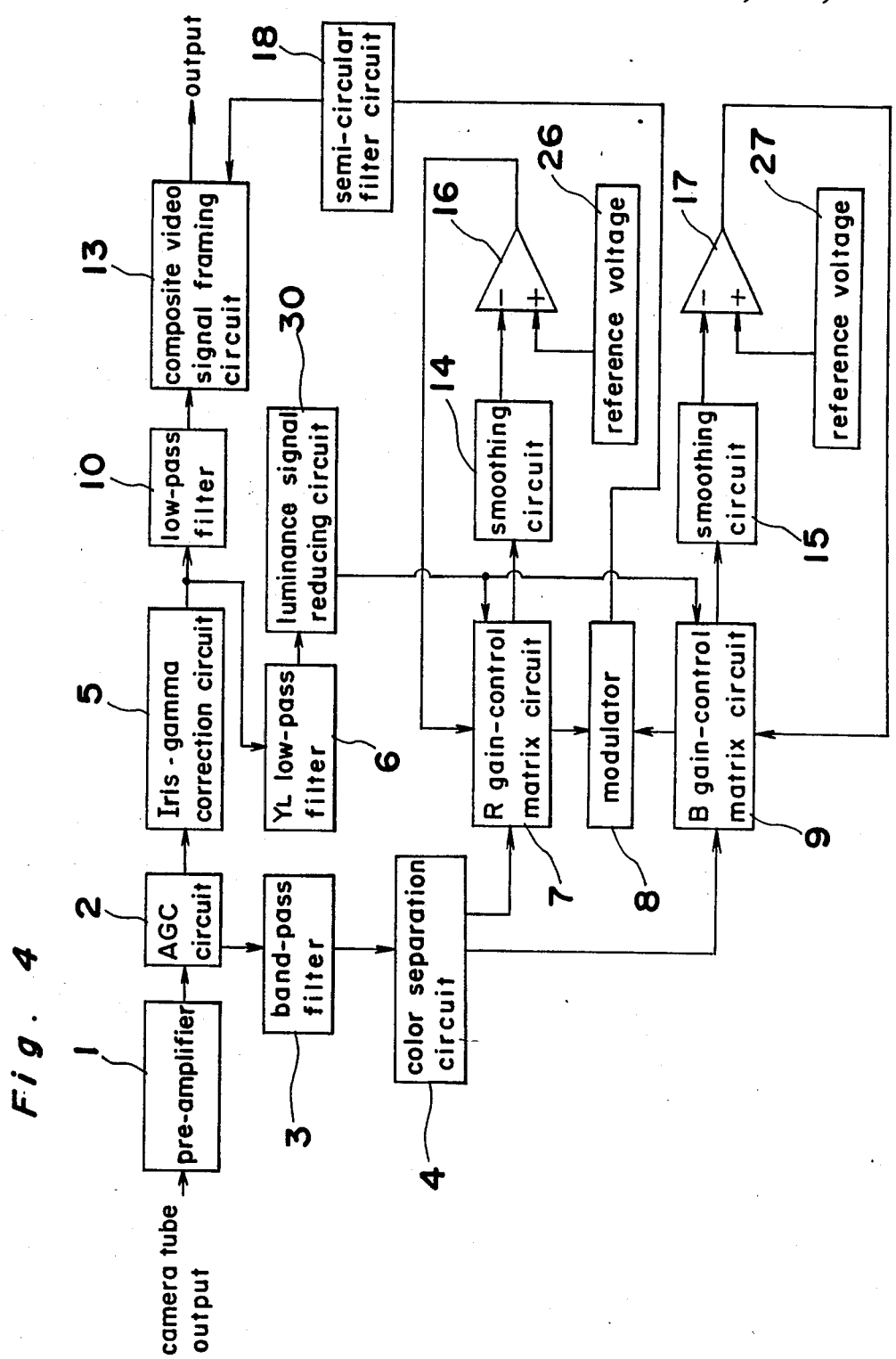
FIG. 4 is an electrical block diagram showing a white balance device in accordance with another embodiment of the present invention.

Referring to FIG. 4, another embodiment of the present invention is shown, wherein the difference between the embodiment of FIG. 4 and the conventional device of FIG. 1 resides in that between the low-pass filter 6 and the gain control matrix circuits 7 and 8 is a luminance signal reducing circuit 30 for reducing the luminance signal in response to the variation of the R and B signals at the time that the low frequency luminance signal components reach a level higher than that of a predetermined level. With this arrangement, the luminance signal level increases in the case that the input signal of the camera tube becomes larger than the input signal in the reference image condition, but both the R signal component and the B signal component become relatively smaller in the case where the luminance signal level being higher than that of a given value.

Accordingly, in the embodiment of FIG. 4, the luminance signal reducing circuit 30 is provided between the R gain-control matrix circuit 7 and the B gain-control matrix circuit 0 to reduce the luminance signal in correspondence to the variation of the R and B signals at the time that the level of the luminance signal becomes higher than a given level, so as to thereby reduce the misoperation of the automatic white balance correcting device at the time of a high luminance input.

As mentioned above, the present invention can provide a white balance correcting device for use in a color video camera which can always offer a picture having good white balance even in the state of inputting high luminance signals during which the luminance signal level is higher than that in the reference image condition.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. In a white balance correcting device for use in a color video camera, wherein two color signals of image signal outputs from an imaging means are supplied to first and second gain-control matrix circuits which also respectively receive low frequency components of the image signal outputs from the image means, and wherein said first and second gain control matrix circuits each output a color difference signal having a portion which is converted into a DC voltage through respective smoothing circuits, and wherein the difference between the DC voltage and a predetermined reference voltage is respectively fed back to said first and second gain-control matrix circuits, the improvement comprising:
a luminance signal reducing means, disposed between one of said first and second gain-control matrix circuits and its respective smoothing circuit, for reducing a level of the low frequency luminance signal component of an input signal supplied thereto, said input signal corresponding to said color difference signal output from its respective one of said first and second gain-control matrix circuits.

2. In a white balance correcting device for use in a color video camera, wherein two color signals of image signal outputs from an imaging means are supplied to first and second gain-control matrix circuits which also respectively receive low frequency components of the image signal outputs from the image means, and wherein said first and second gain-control matrix circuits each output a color difference signal having a portion which is converted into a DC voltage through respective smoothing circuits, and wherein the difference between the DC voltage and a predetermined reference voltage is respectively fed back to said first and second gain-control matrix circuits, the improvement comprising:
a luminance signal reducing means, disposed between said imaging means and one of said first and second gain-control matrix circuits, for reducing a level of the low frequency signal component of an input signal supplied thereto, said input signal corresponding to its respective output of said imaging means.

* * * * *